United States Patent Office.

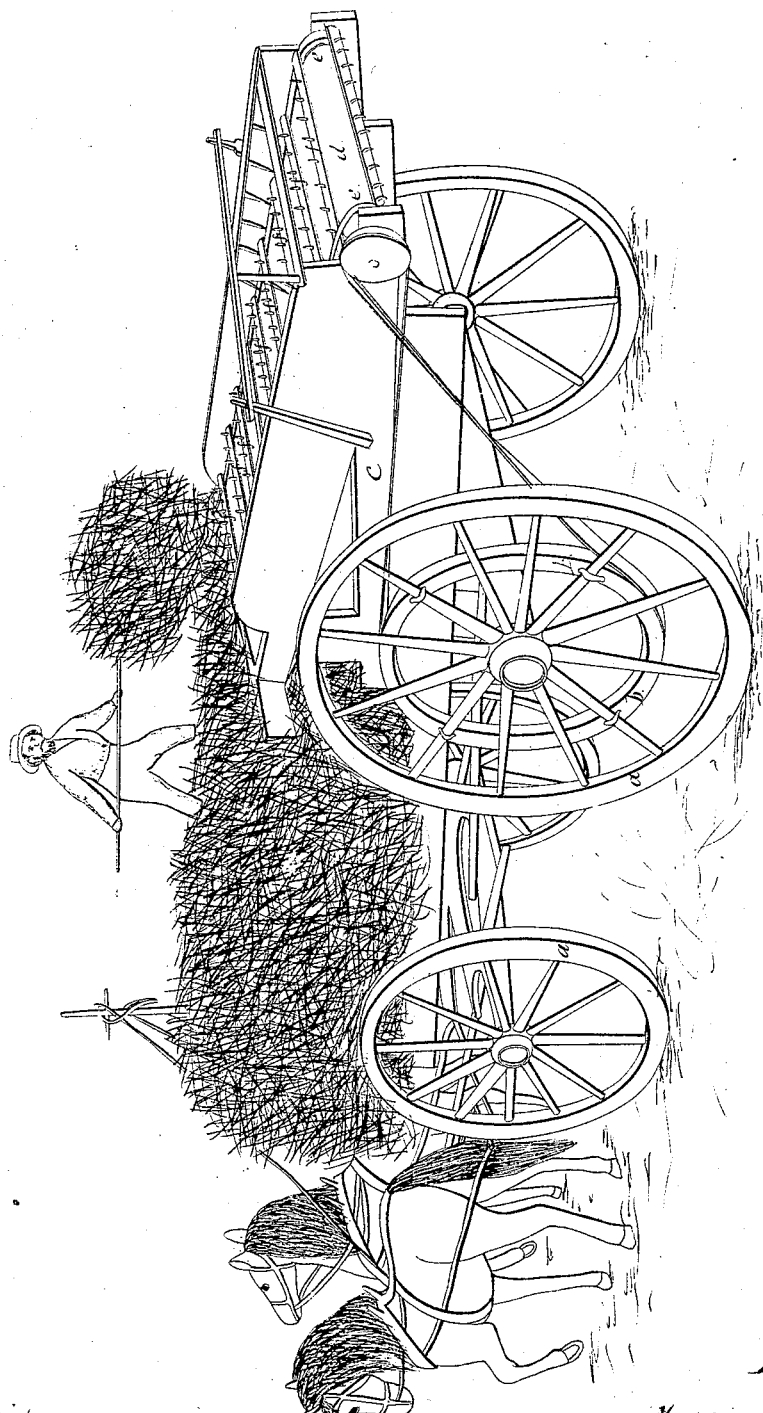

MONTGOMERY BLAIR, OF BARRY, ILLINOIS.

Letters Patent No. 68,343, dated September 3, 1867.

IMPROVEMENT IN STRAW-SCATTERER.

*The Schedule referred to in these Letters Patent and making part of the same.*

Be it known that I, MONTGOMERY BLAIR, of the town of Barry, in the county of Pike, and State of Illinois, have invented a new and useful machine (a Straw-Scatterer) for the purpose of scattering straw on land to preserve winter wheat from freezing out, and for spreading manure; and I do hereby declare that the following is a full and clear description of the construction and operation of the same, reference being had to the accompanying drawing, making a part of this specification, in which—

Figure 1 is a perspective view.

I use a common wagon, with a straw-rack upon it, the ladders or sills of the rack extending four feet back of the hind wheel of the wagon for the machine to set upon. To the inside of the hind wheel of the wagon is attached a pulley, $b$, by means of bolts, with hooks around the spokes, which pulley is three feet in diameter. $c$ is the frame of the machine, and is seven feet long and four feet wide, with a roller at each end of the machine seven inches in diameter. The hindmost roller $d$ has a pulley on one end, same size of roller. There are two bands, $e$, around both rollers, one at each end. Across the machine is a series of rakes, $f$, with the teeth up. These rakes are fastened at each end to the bands $e$ $e$, about ten inches apart. These rakes carry the straw back when in motion. On top of the machine is the stop-rake $g$, angular in shape, with the teeth downwards. This rake is to stop the straw from leaving the machine too fast. It is adjustable, so that the operator can let pass any quantity he may desire.

The machine is set in motion by means of a band around pulley $b$ and around pulley on the end of roller $d$, which band is crossed to reverse the motion, and is all set in motion by the moving of the wagon.

What I claim as my invention, and desire to secure by Letters Patent, is—

The foregoing-described machine, with its combination of pulleys, rollers, and revolving rakes and stop-rakes, all moved by means of bands and pulley attached to a common wagon.

MONTGOMERY BLAIR.

Witnesses:
CALVIN JACKSON,
CALVIN DAVIS.